(12) United States Patent
Jiang et al.

(10) Patent No.: US 7,450,370 B2
(45) Date of Patent: Nov. 11, 2008

(54) SECURING ASSEMBLY FOR KEYBOARD OF PORTABLE COMPUTER

(75) Inventors: Xiao-Gang Jiang, Shenzhen (CN); Shui-Jun Ye, Shenzhen (CN); Hung-Chun Lu, Tu-Cheng (TW); Chien-Li Tsai, Tu-Cheng (TW); Wen-Kang Lo, Tu-Cheng (TW)

(73) Assignees: Hong Fu Jin Precision Industry (Shenzhen) Co., Ltd., Bao-an District, Shenzhen, Guangdong Province (CN); Hon Hai Precision Industry Co., Ltd., Tu-Cheng, Taipei Hsien (TW)

(*) Notice: Subject to any disclaimer, the term of this patent is extended or adjusted under 35 U.S.C. 154(b) by 84 days.

(21) Appl. No.: 11/494,076

(22) Filed: Jul. 27, 2006

(65) Prior Publication Data

US 2007/0025070 A1 Feb. 1, 2007

(30) Foreign Application Priority Data

Jul. 29, 2005 (CN) .................... 2005 2 0062293 U

(51) Int. Cl.
*H05K 7/00* (2006.01)
(52) U.S. Cl. ........................................ 361/680; 341/22
(58) Field of Classification Search ................ 361/680, 361/732; 341/22
See application file for complete search history.

(56) References Cited

U.S. PATENT DOCUMENTS

| 5,576,929 A | * | 11/1996 | Uchiyama et al. ............ 361/680 |
| 5,786,775 A | * | 7/1998 | Chang .......................... 341/22 |
| 5,966,284 A | | 10/1999 | Youn et al. |
| 6,320,743 B1 | | 11/2001 | Jin et al. |
| 6,493,215 B1 | | 12/2002 | Chiang et al. |
| 6,751,089 B2 | | 6/2004 | Hsieh |

FOREIGN PATENT DOCUMENTS

TW 352167 2/1999

* cited by examiner

*Primary Examiner*—Lisa Lea-Edmonds
*Assistant Examiner*—Ingrid Wright
(74) *Attorney, Agent, or Firm*—Morris, Manning & Martin LLP; Tim Tingkang Xia

(57) ABSTRACT

A securing assembly includes a chassis comprising a top wall, a keyboard mounted on the top wall of the chassis, at least one securing member pivotably mounted on the chassis, and at least one elastic member. The chassis defines a positioning hole therein. The at least one securing member has a securing portion for locking the keyboard, a releasing portion for unlocking the keyboard, and a positioning portion engaging in the positioning hole of the chassis for positioning the securing member. The at least one elastic member is attached to the at least one securing member and the chassis for urging the at least one securing member to pivot, thereby unlocking the keyboard.

17 Claims, 5 Drawing Sheets

SECURING ASSEMBLY FOR KEYBOARD OF PORTABLE COMPUTER

BACKGROUND

1. Technical Field

The present invention relates to securing assemblies for a keyboard, and more particularly to a securing assembly for a keyboard of a portable computer allowing convenient assembly or disassembly.

2. Description of Related Art

In recent years, portable computers have greatly increased in popularity. One vital factor contributing to the increasing popularity of the portable computer is its decreasing size and weight. A portable computer generally comprises a chassis with a frame and a keyboard mounted on the frame. In a conventional method, a plurality of screws is applied to install a keyboard device to a portable computer. However, it is very inconvenient for installation, or for removal of the keyboard during maintenance.

A typical keyboard device comprises a base plate, a plurality of key caps, and two fastening devices. Each fastening device comprises a housing, an upper cover, a sliding portion, and a spring installed inside the housing. The sliding portion is retractably installed in the housing. When installing the keyboard device in a portable computer, the upper cover is pulled back causing the sliding portion to retract into the housing. After placing the keyboard device in a sunken portion on the upper side of the housing of a portable computer, the upper cover is released and the sliding portion rebounds from the housing because of the spring. Thus, an end of the sliding portion is inserted into the sunken portion, and fixed in place. When removing the keyboard device, the upper cover is pulled back again causing the sliding portion to retract into the housing, and the keyboard device is removed from the housing of the portable computer. However, since the portable computer is often carried and moved about, the keyboard device may unexpectedly be released from the portable computer due to vibration or impact. Thus, an improved securing assembly, which solves the above-mentioned problems, is strongly desired.

What is needed, therefore, is a securing assembly for a keyboard of a portable computer allowing convenient assembly or disassembly.

SUMMARY

In one preferred embodiment, a securing assembly includes a chassis having a top wall, a keyboard mounted on the top wall of the chassis, at least one securing member pivotably mounted on the chassis, and at least one elastic member. The chassis defines a positioning hole therein. The at least one securing member has a securing portion for locking the keyboard, a releasing portion for unlocking the keyboard, and a positioning portion engaging in the positioning hole of the chassis for positioning the securing member. The at least one elastic member is attached to the at least one securing member and the chassis for urging the at least one securing member to pivot, thereby unlocking the keyboard.

Other advantages and novel features will be drawn from the following detailed description of preferred embodiments with the attached drawings, in which:

DETAILED DESCRIPTION OF THE EMBODIMENTS

Figure 1:
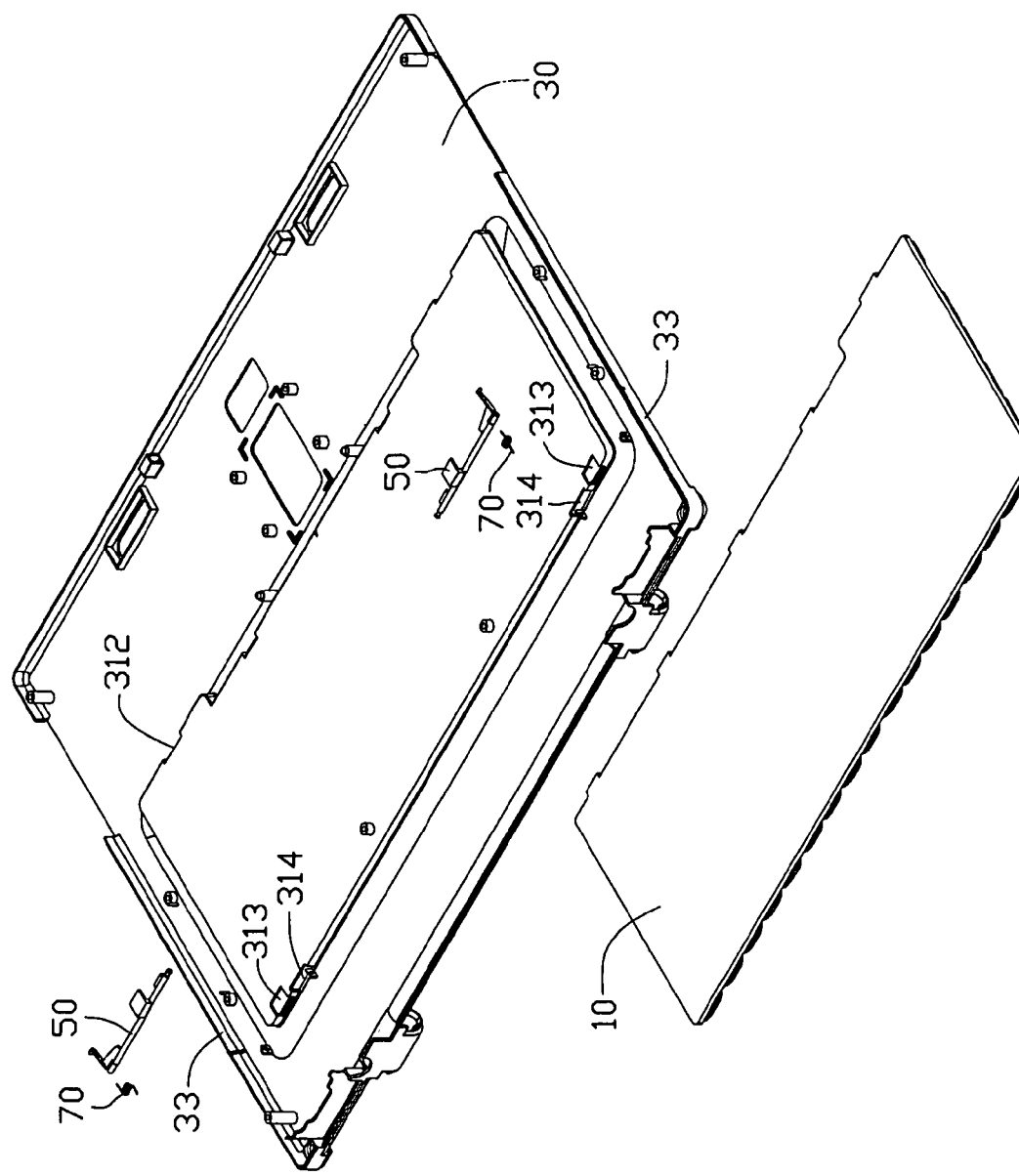
FIG. 1 is an exploded, isometric view of a securing assembly for a keyboard of a portable computer in accordance with a preferred embodiment of the invention, the securing assembly comprising a chassis, a pair of securing members, and a pair of elastic members.
Figure 2:
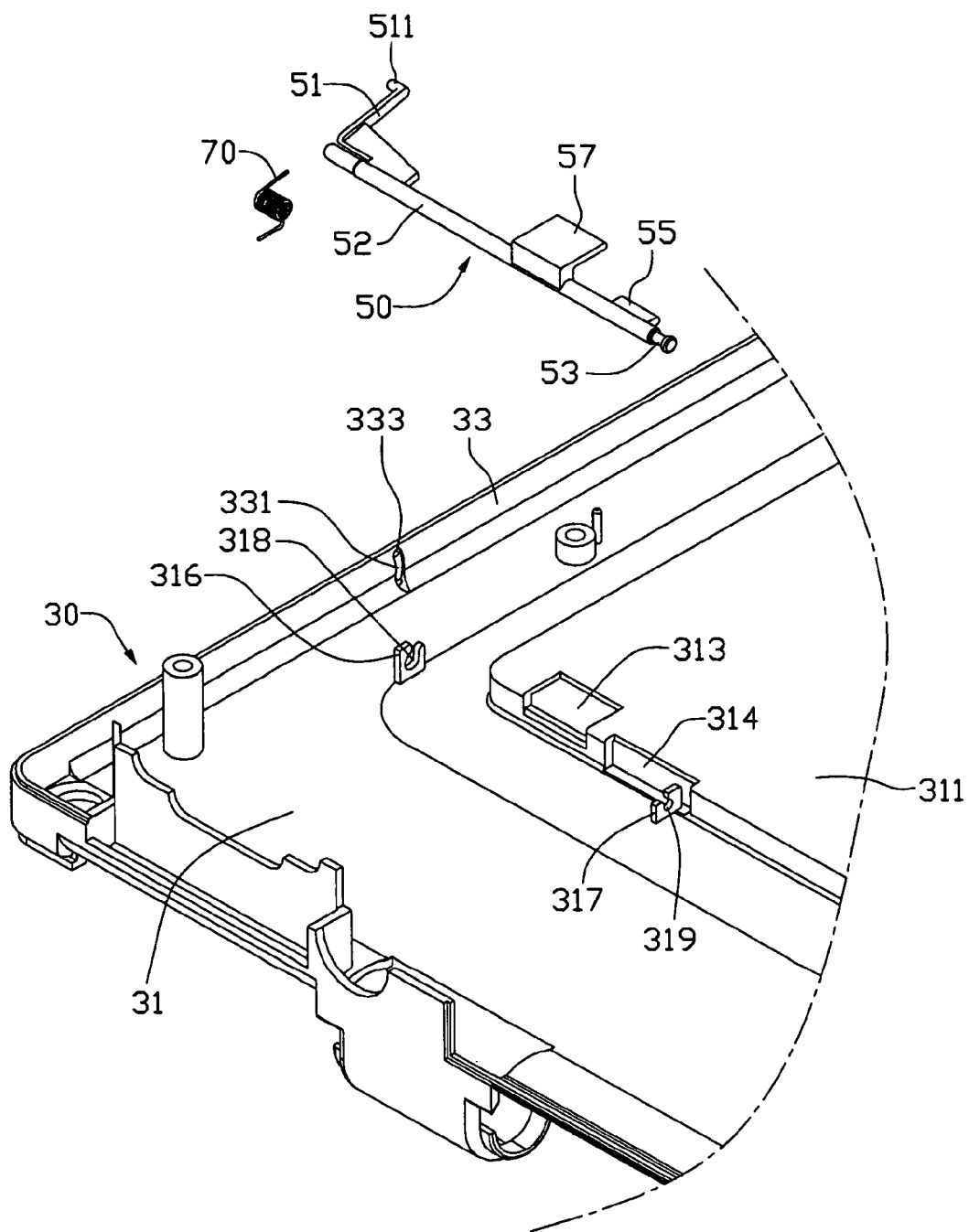
FIG. 2 is an enlarged view of a part of FIG. 1.
Figure 3:
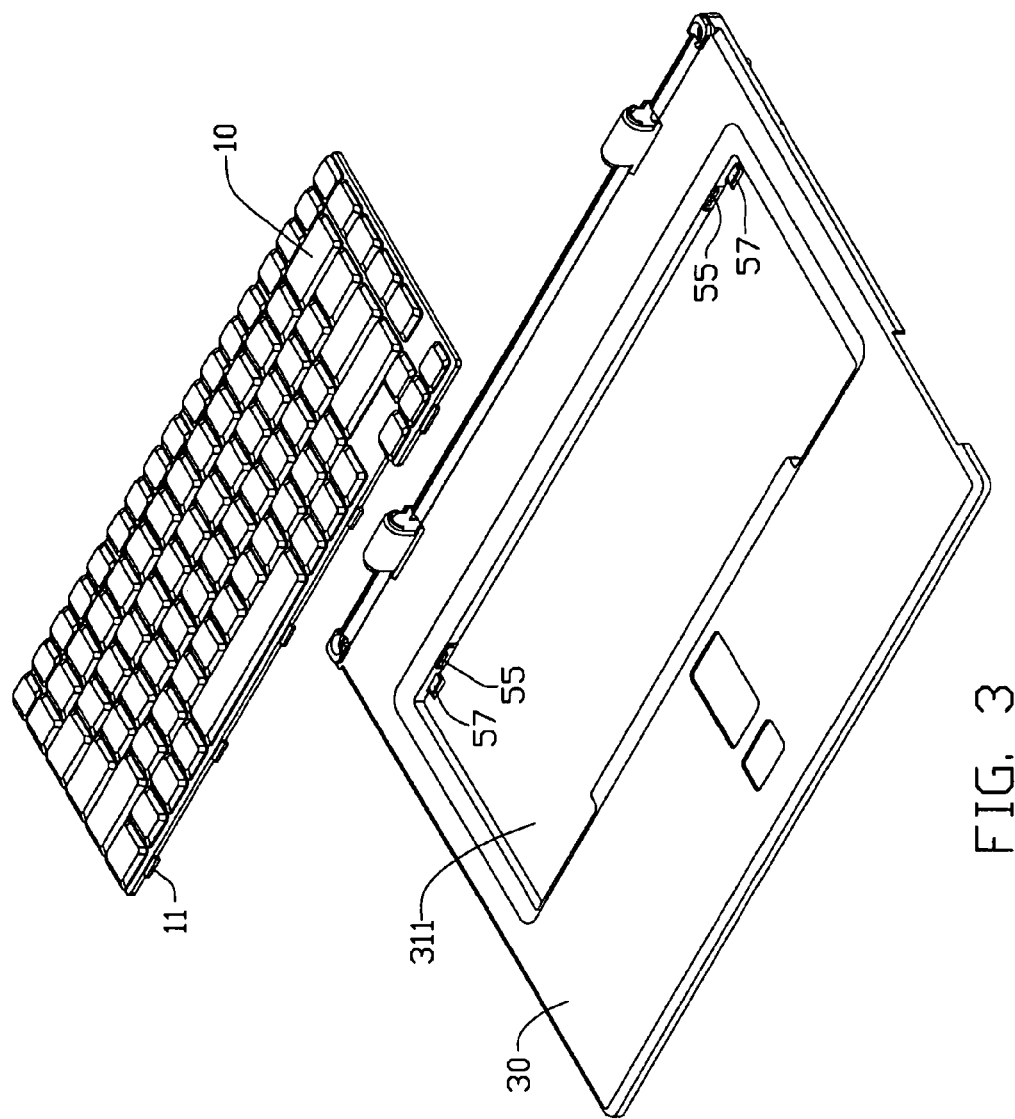
FIG. 3 is a pre-assembled inverted view of the securing assembly of FIG. 1.

Referring to FIGS. 1, 2, and 3, a securing assembly in accordance with a preferred embodiment of the invention, is used to secure a keyboard to a chassis of an electronic device like a portable computer. The securing assembly comprises a keyboard 10, a chassis 30, a pair of securing members 50, and a pair of elastic members 70. The elastic members 70 may be torsion springs or the like.

The keyboard 10 is mounted on the chassis 30. A plurality of insert tabs 11 extends out from an edge of a side of the keyboard 10.

The chassis 30 includes a top wall 31 and two opposite sidewalls 33. The top wall 31 has a depressed portion to form a keyboard mounting area 311. An edge of one side of the keyboard mounting area 311 defines a plurality of receiving slots 312 therein, for receiving the corresponding insert tabs 11. Two through holes 313, 314 are defined near one corner of an opposite side of the keyboard mounting area 311, and two through holes 313, 314 are symmetrically defined in near an opposite corner of the opposite side. The through holes 313 are L-shaped, and the through holes 314 are rectangular. An inner side of the top wall 31, adjacent to each of the through holes 313, 314, is formed to have a first mounting portion 316 and a second mounting portion 317 thereon. The first mounting portion 316 defines a cutout 318 therein, and the second mounting portion 317 defines a cutout 319 therein. An inner side of each sidewall 33 defines an arcuate sliding slot 331 therein, and an end of each sliding slot 331 defines a positioning hole 333 therein.

The securing members 50 are made of plastic or other elastic materials. The securing members 50 are symmetrically mounted on the inner side of the top wall 31 of the chassis 30. Each securing member 50 has a shaft 52 thereon. A rod 51 extends perpendicularly from an end of each shaft 52. Each rod 51 has a post 511, parallel to the shaft 52, extending perpendicularly from a distal end thereof, for engaging in the positioning holes 333 of the sidewall 33 of the chassis 30. A pivot 53 is formed on an opposite end of each shaft 52 for engaging in the cutouts 319 of the second mounting portions 317. Each securing member 50 has a securing portion 55 formed thereon, for extending through the through holes 314 of the top wall 31. Each shaft 52 has a releasing portion 57 formed between the securing portion 55 and the rod 51, for extending through the through holes 313 of the top wall 31.

Figure 4:
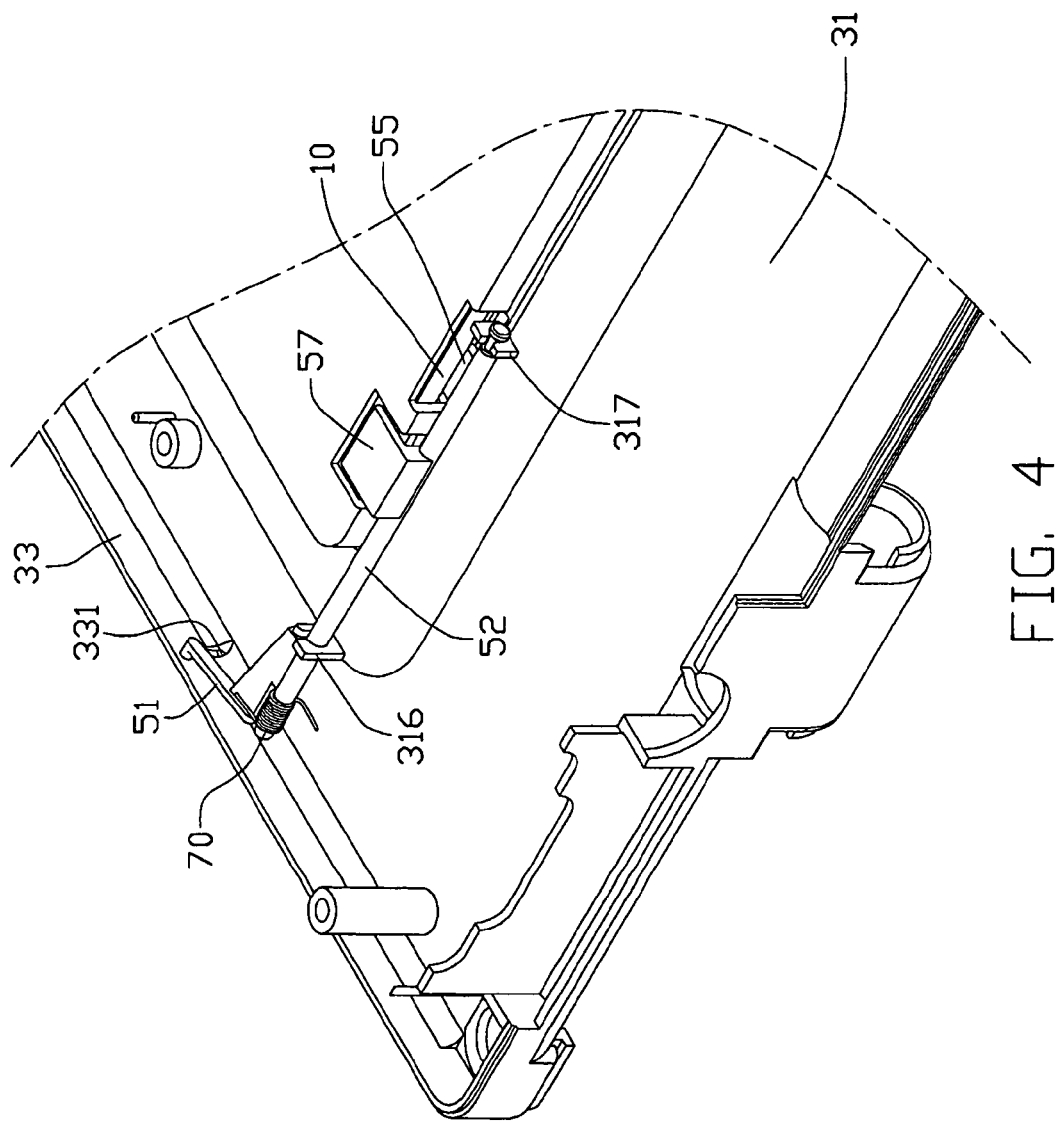
FIG. 4 is an assembled view of FIG. 2, showing the securing assembly in a locked state.
Figure 5:
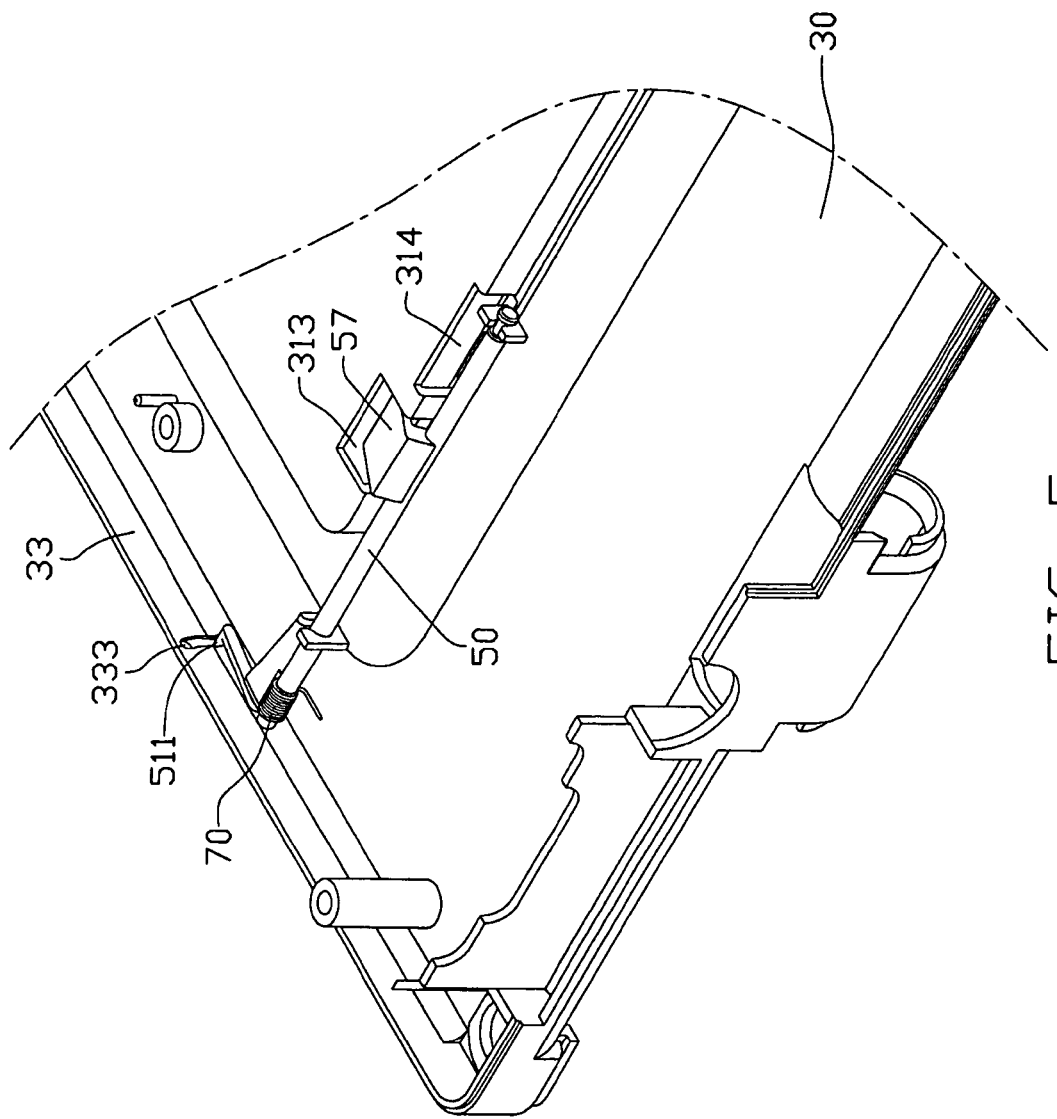
FIG. 5 is similar to FIG. 4, but showing the securing assembly in an unlocked state.

Referring to FIG. 4, in assembly of the securing members 50, the elastic members 70 are first disposed on an end of the securing members 50 respectively. Then, the shafts 52 and the pivots 53 of the securing members 50 engage in the cutouts 318 of the corresponding first mounting portion 316 and the corresponding cutout 319 of the second mounting portion 317, respectively. The posts 511 of the securing members 50 are slidably received in the sliding slots 331 of the sidewalls 33 in an unlocked position. The releasing portions 57 and the securing portions 55 of the securing members 50 extend through the through holes 313 and the through holes 314, respectively. In assembly of the keyboard 10, the insert tabs 11 of the keyboard 10 are first inserted in the corresponding receiving slots 312, and the keyboard 10 is then pressed down. An edge of an opposite side of the keyboard 10 presses on the releasing portions 57 of the securing members 50, thereby urging the securing members 50 to rotate downwardly. The posts 511 slide along the sliding slots 331 and then engagingly received in the positioning holes 333 of the sidewall 33 in a locked position. Simultaneously, the securing portions 55 pivot with the securing members 50 and then abut against the edge of the keyboard 10. The keyboard 10 is thus fixedly mounted on the keyboard mounting area 311 of the chassis 30. At that time, the elastic members 70 are torqued. One end of each elastic member 70 abuts the rods 51 of the securing members 50, and the other ends of the elastic members 70 abut against the inner side of the top wall 31 of the chassis 30, respectively.

In removal of the keyboard 10, the posts 511 are first pushed inward along a direction perpendicular to the sidewall 33, to disengage from the positioning holes 333. Then, the securing members 50 rotate due to rebounding of the elastic members 70 until the posts 511 slide to an unlocked position in an opposite end of the sliding slot 331. Simultaneously, the securing portions 55 of the securing members 50 give way to the keyboard 10, and the releasing portions 57 of the securing members 50 lift up the keyboard 10. The keyboard 10 is then removed from the chassis 30.

While the present invention has been illustrated by the description of preferred embodiments thereof, and while the preferred embodiments have been described in considerable detail, it is not intended to restrict or in any way limit the scope of the appended claims to such details. Additional advantages and modifications within the spirit and scope of the present invention will readily appear to those skilled in the art. Therefore, the present invention is not limited to the specific details and illustrative examples shown and described.

What is claimed is:

1. A securing assembly comprising:
    a chassis comprising a top wall, the chassis defining a positioning hole therein;
    a keyboard mounted on the top wall of the chassis;
    at least one securing member pivotably mounted on the chassis, the at least one securing member having a securing portion extending therefrom and engaging a top surface of the keyboard for locking the keyboard, a releasing portion extending therefrom and engaging a bottom surface of the keyboard for unlocking and lifting up the keyboard, and a positioning portion engaging in the positioning hole of the chassis for positioning the securing member; and
    at least one elastic member attached to the at least one securing member and the chassis for urging the at least one securing member to pivot, thereby unlocking the keyboard.

2. The securing assembly as described in claim 1, wherein the chassis comprises a substantially arc-shaped sidewall with a sliding slot defined therein, the positioning hole is defined in an end of the sliding slot and communicates with an outer side of the chassis for exposing and facilitating manipulating the positioning portion.

3. The securing assembly as described in claim 2, wherein a rod is formed at an end of the at least one securing member, and the positioning portion is a post formed on the rod and slidingly received in the sliding slot.

4. The securing assembly as described in claim 3, wherein the at least one elastic member is torsion spring disposed around a portion of the at least one securing member, two ends of the at least one elastic member abut the rod of the at least one securing member and the top wall of the chassis, respectively.

5. The securing assembly as described in claim 1, wherein the top wall of the chassis defines a first through hole therein for extension of the releasing portion of the at least one securing member therethrough, and a second through hole therein for extension of the securing portion of the at least one securing member therethrough.

6. The securing assembly as described in claim 1, wherein the top wall of the chassis forms a pair of mounting portions for pivotably mounting the at least one securing member thereon.

7. The securing assembly as described in claim 1, wherein the chassis defines a plurality of receiving slots therein, and the keyboard forms a plurality of insert tabs thereon for engaging in the corresponding receiving slots.

8. A mounting mechanism for securing a keyboard in a chassis, comprising:
    at least one securing member mounted on the chassis and being pivotable between a locked position, and an unlocked position, the at least one securing member having a securing portion extending therefrom and engaging a top surface of the keyboard for locking the keyboard in the locked position, and a releasing portion extending therefrom and engaging a bottom surface of the keyboard for unlocking and lifting up the keyboard in the unlocked position; and
    at least one elastic member attached to the at least one securing member and the chassis for urging the at least one securing member to pivot from the locking position to the unlocking position.

9. The mounting mechanism as described in claim 8, wherein the chassis comprises a top wall and a sidewall extending from the top wall, and the keyboard is mounted on the top wall of the chassis.

10. The mounting mechanism as described in claim 9, wherein a sliding slot is defined in the sidewall of the chassis, and a post formed on the at least one securing member slides in the sliding slot.

11. The mounting mechanism as described in claim 10, wherein the sidewall of the chassis defines a positioning hole in an end of the sliding slot for receiving the post, thereby positioning the at least one securing member, and the post is operably exposed outside the chassis from the positioning hole.

12. The mounting mechanism as described in claim 9, wherein the at least one elastic member is a torsion spring disposed around a portion of the at least one securing member, and two ends of the at least one elastic member abut the at least one securing member and the top wall of the chassis, respectively.

13. The mounting mechanism as described in claim 9, wherein the top wall of the chassis defines a first through hole for extension of the releasing portion of the at
    least one securing member therethrough, and a second through hole for extension of the securing portion of the at least one securing member therethrough.

14. The mounting mechanism as described in claim 8, wherein the chassis defines a plurality of receiving slots therein, and the keyboard forms a plurality of insert tabs thereon for engaging in the corresponding receiving slots.

15. An electronic device comprising:

a chassis of an electronic device configured to enclose said electronic device, said chassis defining a keyboard mounting area along a side thereof;

a keyboard removably receivable in said keyboard mounting area of said chassis to function for said electronic device therein; and a securing member installable in said chassis beside said keyboard mounting area of said chassis, said securing member rotatably movable relative to said chassis and comprising a securing portion extending therefrom to engage with a top surface of said received keyboard in said keyboard mounting area for retaining said keyboard in said keyboard mounting area when said securing member rotatably moves along a first direction, and comprising a releasing portion extending therefrom to engage with and push up a bottom surface of said received keyboard in said keyboard mounting area for expelling said keyboard to move out of said keyboard mounting area when said securing member rotatably moves along a second direction opposite to said first direction.

16. The electronic device as described in claim 15, further comprising an elastic member removably attachable to said securing member to urge said securing member rotatably movable along said second direction.

17. The electronic device as described in claim 16, wherein the chassis comprises a positioning hole in a sidewall thereof, the securing member comprises a post engaging in and exposed outside the chassis from the positioning hole to lock the securing member, when the post is pressed to disengage from the positioning hole, the elastic member urges the securing member to move along the second direction.

* * * * *